US 7,090,920 B2

(12) United States Patent
Davis et al.

(10) Patent No.: US 7,090,920 B2
(45) Date of Patent: Aug. 15, 2006

(54) POLY(ARYLENE ETHER) ADHESIVE COMPOSITIONS

(75) Inventors: Michael J. Davis, Coshocton, OH (US); James Estel Tracy, Killbuck, OH (US); Geoffrey Henry Riding, Castleton, NY (US); Gary William Yeager, Schenectady, NY (US)

(73) Assignee: General Electric Company, Pittsfield, MA (US)

( * ) Notice: Subject to any disclaimer, the term of this patent is extended or adjusted under 35 U.S.C. 154(b) by 30 days.

(21) Appl. No.: 11/031,399

(22) Filed: Jan. 7, 2005

(65) Prior Publication Data

US 2005/0158552 A1    Jul. 21, 2005

Related U.S. Application Data

(62) Division of application No. 09/644,012, filed on Aug. 22, 2000, now Pat. No. 6,906,120.

(60) Provisional application No. 60/212,752, filed on Jun. 20, 2000.

(51) Int. Cl.
*B32B 15/082* (2006.01)

(52) U.S. Cl. .................. 428/413; 428/414; 428/416; 428/457; 428/458; 156/325; 156/326; 156/327; 156/330

(58) Field of Classification Search .................. None
See application file for complete search history.

(56) References Cited

U.S. PATENT DOCUMENTS

| 3,306,875 | A | 2/1967 | Hay |
| 3,900,662 | A | 8/1975 | Yuan |
| 4,054,553 | A | 10/1977 | Olander |
| 4,092,294 | A | 5/1978 | Bennett, Jr. et al. |
| 4,196,116 | A | 4/1980 | Haaf et al. |
| 4,477,649 | A | 10/1984 | Mobley |
| 4,477,651 | A | 10/1984 | White et al. |
| 4,496,695 | A | 1/1985 | Sugio et al. |
| 4,571,341 | A | 2/1986 | Sugimura |
| 4,842,946 | A | 6/1989 | Foust et al. |
| 4,853,423 | A | 8/1989 | Walles et al. |
| 4,904,760 | A | 2/1990 | Gaku et al. |
| 4,948,832 | A | 8/1990 | Ostermayer et al. |
| 4,959,121 | A | 9/1990 | Dumas et al. |
| 5,308,565 | A | 5/1994 | Weber et al. |
| 5,352,745 | A | 10/1994 | Katayose et al. |
| 5,397,822 | A | 3/1995 | Lee, Jr. |
| 5,557,843 | A | 9/1996 | McKenney et al. |
| 5,712,039 | A | 1/1998 | Marhevka et al. |
| 5,834,565 | A | 11/1998 | Tracey et al. |
| 5,973,144 | A | 10/1999 | Ishida |
| 6,387,990 | B1 | 5/2002 | Yeager |
| 6,518,362 | B1 | 2/2003 | Clough et al. |
| 6,576,718 | B1 | 6/2003 | Yeager et al. |

FOREIGN PATENT DOCUMENTS

| EP | 0 492 154 B1 | 11/1991 |
| EP | 0 916 691 A2 | 11/1998 |
| EP | 0 921 158 A2 | 11/1998 |

OTHER PUBLICATIONS

European Search Report; EP 01 30 5293; Nov. 25, 2002 (3 pages).

*Primary Examiner*—Monique R. Jackson

(57) ABSTRACT

A laminate, comprises a thermoplastic substrate, a conductive metal foil at least partially disposed on at least one side of the substrate, and an adhesive disposed between the substrate and the metal foil. The adhesive includes a blend of a poly(arylene ether), a thermosetting resin, a toughening agent, a plasticizer, and a cure agent. The laminate finds particular utility in circuit board applications.

20 Claims, No Drawings

POLY(ARYLENE ETHER) ADHESIVE COMPOSITIONS

CROSS REFERENCE TO RELATED APPLICATIONS

This application is a division of U.S. application Ser. No. 09/644,012, filed Aug. 22, 2000, now U.S. Pat. No. 6,906,120 which claims the benefit of U.S. Provisional Application Ser. No. 60/212,752, filed Jun. 20, 2000.

BACKGROUND OF THE INVENTION

The present invention relates to adhesive compositions for thermoplastic substrates and a method of manufacture thereof. More particularly, the present invention relates to such adhesive compositions comprising poly(arylene ether) polymers.

There remains a continuing need in the art for thermosetting adhesives for use with thermoplastic adherends, particularly substrates used in, and associated with, fabricating printed circuit boards. The need for miniaturization of circuit boards has increased and methods such as incorporation of microvias in printed circuit boards have been developed. Furthermore, it would be beneficial to have substrates capable of microvia technology and capable of being laser drilled without interference of reinforcements such as woven or chopped fiberglass.

In the fabrication of printed circuit boards, it is known to use copper foil coated with adhesive, or copper foil with a cured adhesive which is then coated with adhesive and partially cured as described in U.S. Pat. No. 5,557,843. This method is limited by the thickness of the copper foil that can be effectively coated and handled for practical use in the printed circuit board or rigid-flex board. Thermoplastic films are known which are metallized with copper or other conductive material to low thicknesses such as 3 microns or 5 microns. Examples of metallized polyimides are described in, for example, U.S. Pat. Nos. 4,842,946 and 4,959,121. These metallized films can be coated with adhesive and used, for example, in microvia and rigid-flex applications.

Adhesives suitable for bonding thermoplastic adherends, and circuit boards in particular, need to have good solvent resistance, toughness, and adhesiveness. The partially cured substrate used to manufacture circuit boards must have the characteristics of minimal flow under heat and pressure to provide adequate flow and fill, resistance to cracking, and the ability to develop adequate bond strength to all adherends during cure. When used with circuit boards, adherends include thermoplastic film, copper and/or treated copper for bond improvements, and other resinous plastic substrates used in the circuit board. When used in printed circuit boards, the dielectric loss and expansion properties of the adhesives should be adjustable to closely match those of the substrate. U.S. Pat. No. 3,900,662 to Yuan discloses an acrylic based adhesive, but such adhesives have relatively low glass transition temperatures and high expansion values at soldering temperatures. Thermosetting poly(arylene ether) resin compositions have a number of the desired properties, but lower molecular weight poly(arylene ether)s useful for impregnating reinforcement materials are brittle in partially cured form while higher molecular weight poly(arylene ether)s have difficulty forming films at room temperature due to high viscosity and tend to be brittle in partially cured form. U.S. Pat. No. 4,853,423 to Walles, for example, discloses poly(arylene ether) resins and polyepoxy resins together with novolac resins for circuit boards. More recent patents directed to poly(arylene ether) resins, for example U.S. Pat. No. 5,834,565 to Tracy et al., disclose use of poly(arylene ether) polymers in circuit board substrate materials having number average molecular weights of less than about 3,000. Commercially available poly(arylene ether) resins have number average molecular weights in the range of about 15,000 to about 25,000. Although cured neat films of these compositions are tough, the partially cured or B-stage product tends to be brittle. There accordingly remains a need in the art for improved, less brittle thermosetting adhesives for use with thermoplastic compositions.

BRIEF SUMMARY OF THE INVENTION

In the most generic form, the invention may be described as a curable, thermosetting adhesive composition for use with thermoplastic adherends comprising a poly(arylene ether) resin having a number average molecular weight in the range from about 8,000 to about 13,000, a thermosetting resin, a toughening agent, a cure agent, and an optional plasticizer. In use, the composition may be blended, applied to the substrate to be adhered, partially cured or dried, and then fully cured joining the substrate to another adherend.

DETAILED DESCRIPTION OF THE INVENTION

A curable, thermosetting adhesive composition comprises a poly(arylene ether) resin having a number average molecular weight in the range from about 8,000 to about 13,000, a thermosetting resin, a toughening agent to compatibilize the poly(arylene ether) resin and the thermosetting resin, a cure agent, and an optional plasticizer.

In an advantageous feature, the composition may be blended, applied to the substrate to be adhered, partially cured, and then fully cured joining the substrate to another adherend. Suitable bond strengths are achieved between thermoplastic substrate materials, conductive metals such as copper, and other thermoset base circuit board materials.

This invention is directed to an adhesive resin composition having better processability, exhibiting reduced B-staged (partially cured) friability, and minimal flow during lamination. Specifically, the composition, comprising a poly(arylene ether), a toughening agent, and a thermosetting resin, is applied to a thermoplastic substrate that may have an electrically conductive metal, such as copper, on one side. Thermosetting resins are polymers that form a three-dimensional cross-linked network of polymer chains that cannot be softened or reheated for additional use. Before they are cross-linked, thermosetting resins are fluid and must contain enough reactive functionality to form a three-dimensional network during curing. General classes of thermosetting resins include, for example, epoxy, phenolic, alkyds, acrylate, polyester, polyimide, polyurethane, bis-maleimides, cyanate esters, vinyl, benzocyclobutene resins, and benzoxazines. These compositions may further contain various catalysts, flame retardants, and other constituents, if so desired. The thermosetting components, such as those described above, may be used either alone or in combination with one another or with another thermoplastic resin. When used to coat suitable thermoplastic reinforcing material substrates such as thermoplastic polyimide, polyetherimides, polyesteretherimides, blends of poly(arylene ether) and polyimide, and blends of poly(arylene ether) and polyester, they furnish compatible substrates, particularly applicable for preparing laminated articles suitable for such applications as printed circuit boards, rigid flex circuit boards or any other articles where good dielectric properties are desired. The compositions, before crosslinking, are soluble in organic solvents, e.g., toluene, at elevated temperature and, while a gelling composition at room temperature, become liquid with shear, which facilitates coating of a substrate at room temperature. The cured adhesive layer materials prepared from the compositions are highly solder resistant, solvent resistant, moisture resistant, and flame retardant. The cured materials also have excellent dielectric properties and dimensional stability at high temperatures.

Poly(arylene ether) resins having conventional structures can be employed in the blends, comprising a plurality of structural units of the formula (I):

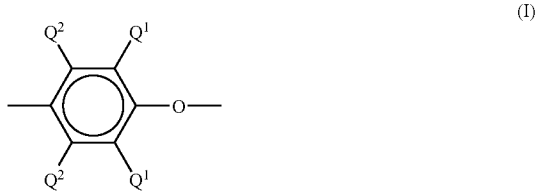

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3-, or 4-methylpentyl and the corresponding heptyl groups. Examples of secondary lower alkyl groups are isopropyl, sec-butyl and 3-pentyl. Preferably, any alkyl radicals are straight chain rather than branched. Preferably, each $Q^1$ is alkyl or phenyl, especially $C_{1-14}$ alkyl, and each $Q^2$ is hydrogen.

Both homopolymer and copolymer poly(arylene ether) polymers are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) polymers containing moieties prepared by grafting vinyl monomers or polymers such as poly(styrene), as well as coupled poly (arylene ether) polymers in which coupling agents such as low molecular weight polycarbonates, quinones, heterocycles and formals undergo reaction in a known manner with the hydroxy groups of two poly(arylene ether) chains to produce a higher molecular weight polymer. Poly(arylene ether) polymers of the composition further include combinations of any of the above. Many suitable random copolymers, as well as homopolymers, are disclosed in the patent literature. Reference is made to U.S. Pat. Nos. 4,054,553, 4,092,294, 4,477,649, 4,477,651 and 4,517,341, the disclosures of which are incorporated by reference herein.

The poly(arylene ether) resin is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether) resins are those having terminal hydroxy groups and a number average molecular weight of about 8,000 to about 13,000, more preferably about 9,000 to about 12,000, most preferably about 10,000 to about 11,000, as determined by gel permeation chromatography. The poly(arylene ether) resin accordingly has an intrinsic viscosity (I.V.) of about 0.20 to about 0.40 deciliters per gram (dl/g), preferably about 0.28 to about 0.32 dl/g, as measured in chloroform at 25° C. Such poly(arylene ether)s may be synthesized directly or obtained by subjecting poly(arylene ether)s to redistribution. Suitable methods for redistribution are described in, for example, U.S. Pat. No. 5,834,565. In one procedure, low molecular weight poly(arylene ether)s are prepared from poly(arylene ether)s typically having a number average molecular weights in the range of about 15,000 to 25,000. Such preparation of a low molecular weight poly(arylene ether) resin can be accomplished by reacting the poly(arylene ether) resin with an oxidizing agent such as a peroxide or a quinone with or without a phenol (including bisphenols). Another procedure is to obtain a low molecular weight poly(arylene ether) resin by oxidative coupling as described above to produce resins of the desired number average molecular weight which is isolated, preferably, by a direct isolation method. However, even such low molecular weight resins can optionally be functionalized with a peroxide or peroxide and a phenol to achieve even lower molecular weight.

Phenolics useful in the redistribution reaction described herein include all known phenol compounds, including those exemplified by formula (II):

wherein $A^1$ is any aromatic, mixed aliphatic aromatic hydrocarbon, heterocycle or derivative of the like, X is a hydroxy residue and n is any integer from 1 to about 10 and, preferably, from 1 to about 5.

In general, any peroxide would be useful in the redistribution reaction, including those described by the following formula (III):

wherein $A^2$ and $A^3$ are any aliphatic acyl, aromatic acyl group, alkyl, or mixed aliphatic aromatic hydrocarbon, hydrogen or inorganic ester moiety or derivatives of the like. Typical peroxides include without limitation: 1) diacyl peroxides such as dibenzoyl peroxide, 4,4'-di-t-butylbenzoyl peroxide or other aryl substituted derivatives, dilauryl peroxide, acetyl benzoyl peroxide, acetyl cyclohexylsulfonyl peroxide and diphthaloyl peroxide; 2) peroxydicarbonates such as dicetylperoxydicarbonate; 3) peroxyacids such as perbenzoic acid, 3-chloroperbenzoic acid, 4-nitroperbenzoic acid, and other substituted derivatives of perbenzoic acid, peroxyacetic acid, peroxypropanoic acid, peroxybutanoic acid, peroxynonanoic acid, peroxydodecanoic acid, diperoxyglutaric acid, diperoxyadipic acid, diperoxyoctanedioic acid, diperoxynonanedioic acid, diperoxydecanedioic acid, diperoxydodecandioic acid, monoperoxyphthalic acid, as well as the inorganic acids such as peroxysulfuric acid, peroxydisulfuric acid, peroxyphosphoric acid, peroxydiphosphoric acid and their corresponding salts; and 4) peroxycarboxylic esters such as t-butyl performate, t-butyl peracetate, t-butyl peroxyisobutyrate, t-butyl perbenzoate, cumyl perbenzoate, t-butyl peroxynonanoate, t-butyl monoperoxymaleate, t-butyl monoperoxyphthalate, di-t-butyl diperoxyadipates, and 2,5-dimethyl 2,5-bis(benzoylperoxy)hexane.

These peroxides may be used alone or in combination with or without the presence of a catalyst to induce decomposition of the peroxide and increase the rate of radical production. Other oxidizing agents known in the art include quinones such as 2,2',6,6'-tetramethyl diphenoquinone (TMDQ) may also be used in the presence or absence of a phenol.

The poly(arylene ether) resin typically comprises about 5 to about 50 weight percent, preferably about 20 to about 40 weight percent, and most preferably from about 25 to about 35 weight percent, of the total adhesive composition solids.

Adhesive compositions further comprise a thermosetting resin in its monomeric, oligomeric, or polymeric state and include reaction products with art-known curing agents and catalysts. Examples of such thermosetting resins include, for example, epoxy, phenolic, alkyds, allylic, polyester, polyimide, polyurethane, bis-maleimide, cyanate ester, vinyl, benzoxazine, and benzocyclobutene resins. Mixtures of two or more thermosetting resins may also be employed with or without added curing agents or catalysts to produce a polyphenylene ether thermosetting resin. The preferred thermosetting resin comprises an epoxide or mixtures thereof with a phenol, such as 2,2-bis(4-hydroxyphenyl)propane (bisphenol A) or bis(2-hydroxyphenyl)methane (bisphenol F), or a partial condensation product of the epoxy and bisphenols thereof. The thermosetting resin composition used herein, either as a constituent or a reactant, preferably includes at least one bisphenol polyglycidyl ether. The bisphenol polyglycidyl ether preferably employed may be halogen free or a mixture of halogen free and halogen containing polyglycidyl ethers in which bromine is the preferred halogen substituent. The total amount of bromine may be about 10 to about 30 weight percent based on the weight of the solid resin composition.

The preferred thermosetting resin comprises an epoxide or mixtures thereof with a phenol such as a bisphenol A or a partial condensation product of the epoxy and bisphenols. The thermosetting resin composition used herein, either as a constituent or a reactant, preferably includes at least one bisphenol polyglycidyl ether. The bisphenol polyglycidyl ether preferably employed may be halogen free or a mixture of halogen free and halogen containing polyglycidyl ethers in which bromine is the preferred halogen substituent. The total amount of bromine can be about 10 to about 30% by weight.

The epoxide component useful in this invention would include, in its broadest sense, any epoxy compound. Suitable epoxy compounds useful in this formulation include those of Formula (IV):

(IV)

wherein $A^4$ is any aromatic, aliphatic, mixed aliphatic aromatic hydrocarbon, heterocycle or derivative of the like; X is an epoxy containing residue; and n is any integer, preferably from 1 to 100.

When employing an epoxide, it is preferred that the epoxide comprise at least two epoxy compounds, one being brominated to provide flame retardancy and the other at levels sufficient to provide a total bromine content of about 10 to about 30 weight percent, based on the weight of the solid composition. Preferred epoxy compounds include those wherein n is 1 to 4, more preferably those wherein n is 2.

Typical to this family of materials are:

Diepoxides exemplified in general Formula (V)

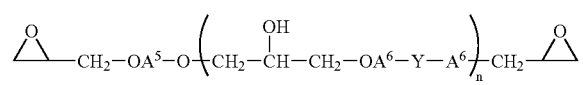

(V)

wherein $A^5$ and $A^6$ are aromatic radicals and Y is a single bond or a bridging radical. The radicals $A^5$ and $A^6$ may be substituted or unsubstituted with typical groups chosen from aryl, alkyl, alkoxy, halo and the like. Y may include bridging radicals such as a alkylene, cycloalkylene, arylene, oxy, thio, sulfonyl, sulfoxy, and carbonyl.

Most common examples of compounds described by Formula (VI) include diglycidyl ethers often produced by the condensation of epichlorohydrin with a bisphenol where n=0. Typical of this class of compounds are the diglycidyl ethers of 4,4'-(1-methylethylidene) diphenol, 4,4'-(1-methylethylidene)bis(2-methylphenol), 4,4'-(1 methylethylidene) bis(2,6-dimethylphenol), 4,4'-(1,1-cyclopentylidene)diphenol, 4,4'-(cyclohexylidene)diphenol, 4,4'-(1 methylethylidene)bis(2,6-dibromo phenol), 4,4'-methylenediphenol, 4,4'-(1-methylethylidene)bis(2-allylphenol), 4,4'-(1-methylethylidene)bis(2-t-butyl-5-methylphenol), 4,4'-(1 methylethylidene)bis(2-t-butyl-5-methylphenol), 4,4'-(1-methylpropylidene)bis(2-t-butyl-5-ethylphenol), 4,4'-(1,4-bis(methylethylidene)phenyl)bis(2-t-butyl-5-methylphenol), 4,4'-biphenol, hydroquinone, resorcinol, and the like. Oligomeric products generated during this condensation reaction are also known and are useful. Such compounds are exemplified by the oligomeric condensation product of bisphenol A and epichlorohydrin (n=0.14) sold by Shell Corporation under the trademark EPON® as EPON® 828.

2) The reaction products of the above diepoxides with bisphenols, commonly referred to as upstaged resins. A typical example includes the condensation product of bisphenol A diglycidyl ether with tetrabromobisphenol A. The partial condensation products suitable for use may be prepared by heating the mixture of compounds, as hereinabove described, at a temperature in the range of about 50° C. to about 225° C., preferably about 70° C. to about 200° C., and most preferably about 100° C. to about 190° C., in the presence of a catalytic amount of at least one basic reagent, such as copper (for instance lithium dimethylcuprate), amine, phosphine, or metal salt with a strong alkoxide counter ion.

The triarylphosphines, especially triphenylphosphine, are the preferred basic reagents for the bisphenol bisepoxide condensation reaction for their effectiveness at low levels, their low tendency to cause side reactions, and their harmlessness when they remain present after the reaction is complete. They are usually employed in the amount of about 0.1% to about 0.5% by weight. The reaction is preferably conducted in an inert atmosphere such as nitrogen, especially when a triarylphosphine is employed as a catalyst. An aromatic hydrocarbon solvent such as toluene, may be employed, but is not critical.

The partial condensation products may comprise about 25% to about 35% brominated compound and about 15% to about 25% epoxidized novolac, with the balance being the non-brominated biphenol polyglycidyl ether. Lower concentrations of brominated compounds or novolacs may cause an unacceptable decrease in solvent resistance and/or flame resistance. An increase in brominated compound may yield an incompatible material. The preferred proportion of brominated compound is in the range of about 28% to about 32%.

3) Multifunctional epoxides as described by Formula (VI) may also be used.

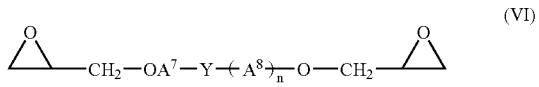
(VI)

Those materials described by Formula (VI) include all epoxidized phenolic resins including epoxidized novolacs and resols. $A^7$ and $A^8$ are aromatic radicals either substituted or unsubstituted with typical substituting groups chosen from aryl, alkyl, alkoxy, halo, and the like. The value of n may range from 0 to about 500.

Most common examples of compounds described by Formula (VI) include glycidyl ethers produced by the condensation of epichlorohydrin with a phenolic resin. Examples of this class of compounds include the glycidyl ethers of phenol formaldehyde novolac, cresol formaldehyde novolac, bromophenol formaldehyde novolac, t-butylphenol formaldehyde novolac, phenolic resins derived from the condensation of phenol with a diene or mixtures of dienes, such as dicyclopentadiene or butadiene, or additionally, with a polybutadiene resin.

Other multifunctional epoxides include phloro glucinol triglycidyl ether and tetrakis(glycidoxyphenyl) ethane.

Glycidyl ethers of amines, amides, or nitrogen containing heterocycles. These materials may include triglycidylcyanurate, triglycidylisocyanurate, N,N,N'N'-tetraglicidyl-diaminodiphenylmethane, N,N,-O-triglycidyl-4-aminophenol, N,N-diglycidyl aniline, and N,N-diglycidyl hydantoin.

Glycidyl ethers of carboxylic acids such as diglycidyl phthalate, diglycidyl tetrahydrophthalate, diglycidyl hexahydrophthalate and diglycidyl adipate.

Homopolymers or copolymers prepared from unsaturated epoxides such as glycidyl acrylate, glycidyl methacrylate and allyl glycidyl ether. As mentioned, these materials may be used as homopolymers or copolymers obtained from mixtures of the unsaturated epoxides mentioned above or mixtures of unsaturated epoxides and other vinyl monomers known in the practice of vinyl polymerization.

Polysiloxanes containing epoxy functionality such as the glycidyl ether of 1,3-bis(3-hydroxypropyl)tetramethyldisiloxane.

Compounds prepared by epoxidation of alkenes, dienes or polyenes, such as phenylglycidyl ether, allylglycidyl ether, a napthylglycidyl ether, 3,4-epoxycyclohexylmethyl 3,4-epoxycyclohexane carboxylate, vinylcyclohexene dioxide and substituted derivatives thereof. In addition, epoxidized polyenes such as polybutadiene resins or butadiene containing copolymers would be useful.

When the epoxide is a mixture, it usually comprises about 30 to about 60 weight percent of the brominated compound and about 5 to about 20 weight percent of the epoxidized novolac (when present), with the balance being the non-brominated bisphenol polyglycidel ether.

Other useful thermosetting components comprise vinylic compounds, including triallylisocyanurate, triallylcyanurate, diallyl phthalate, diallyl isophthalate, diallyl maleate, diallyl fumarate, diethlene glycol diallylcarbonate, triallyl phosphate, ethylene glycol diallyl ether, allyl ethers of trimethylolopropane, partial allyl ethers of pentaerythritol, diallyl sebacate, allylated novolacs, allylated resol resins, polyimides, phenolic resins, benzoxazines, polyurethanes, and/or cyanate esters. These various thermosetting resins can be used either individually or in combination with one another.

Cyanate esters are most broadly defined by formula (VII)

(VII)

wherein $A^9$ is any aromatic, aliphatic, mixed aliphatic aromatic hydrocarbons, heterocycles or derivatives of the like, X is a cyanate group, and n is an integer from 1 to 10 and preferably from 1 to 4. Typical of this class of compounds are those derived from the reaction of cyanogen halides with the bisphenols described above. Various examples of cyanate esters can be found in I. Hamerton, "Chemistry and Technology of the Cyanate Esters", Chapman Hall (1994).

Polyimides, including bismaleimides, include those known in the art, such as those described in D. Wilson, H. D. Stenzenberger and P. M. Hergenrother, "Polyimides", Chapman Hall (1990).

Phenolic resins include those known to the art such as those known in the art, such as those described in A. Knop and L. A. Pilato, "Phenolic Resins: Chemistry, Applications and Performance", Springer-Verlag (1985).

Benzoxazines include those known to the art, such as those described in U.S. Pat. No. 5,973,144 to Ishida.

Polyurethanes include those known in the art, such as those described in S. H. Goodman, "Handbook of Thermoset Plastics", Noyes Publications (1986).

Examples of allylic, vinyl and silicone thermosetting resins include those known in the art, such as those described in S. H. Goodman, "Handbook of Thermoset Plastics", Noyes Publications (1986).

The thermosetting resin typically comprise about 50 to about 95 weight percent, preferably about 52 to about 80 weight percent, and most preferably about 55 to about 60 weight percent by weight of the resin portion of the adhesive composition solids.

A toughening agent is included in the composition to enhance blending and crosslinking of the poly(arylene ether) and the thermosetting resin portion of the adhesive composition. The presence of toughening agents generally reduces friability of the partially cured composition. In the final blend, the functionalized poly(arylene ether)s are commonly referred to as "toughened poly(arylene ethers)s" because of the resultant improved compatibility between the poly (arylene ether)s and the other components. Accordingly, other agents that affect the compatibility of the poly(arylene ether) with the various components of the blend (e.g., the thermosetting resin) are toughening agents. Compatibility is meant to include the stabilization of gross phase separation between the components of the blend. Indicators of improved compatibilization include, for example, increased ductility and improved phase morphology stabilization.

Improved compatibility of the blend components contributes to the desirable physical properties of the adhesive.

Preferred toughening agents include polyvinyl butyral resins, including copolymers of polyvinyl butyral and other vinyl monomers such as vinyl acetate, and partially hydrolyzed derivatives therefrom. An example of such a material is poly(vinyl butyral-co-polyvinyl alcohol-co-polyvinyl acetate). Of particular utility is a polyvinyl butyral resin of molecular weight 50,000 to 120,000, available from Solutia under the trademark such as BUTVAR®. Other toughening agents include, for example, low molecular weight thermoplastic elastomers known in the art, such as styrene-butadiene-styrene (SBS) block copolymers, styrene ethylene styrene (SES) block copolymers, styrene-ethylene-butylene-styrene (SEBS) block co-polymers and functionalized butadiene-acrylonitrile copolymers such as those sold under the tradename HYCAR® Reactive Liquid Rubbers by B. F. Goodrich Company. Also included are core shell type toughening agents such as styrene-butadiene and styrene-butadiene core shell rubbers. Other useful materials may be found in W. Hofmann and C. Hanser, "Rubber Technology Handbook", Verlag Publishers (1989); and B. Ellis, "Chemistry and Technology of the Epoxy Resins", Chapman Hall (1993).

The toughening agent typically comprise about 0.5 to about 15 weight percent, preferably about 3 to about 10 weight percent, and most preferably about 4 to about 8 weight percent, of the resin portion of the adhesive composition.

A cure agent is added to the composition to effect crosslinking between the hydroxyl groups of the poly(arylene ether) and reactive thermosetting components. For the purpose of this invention, the term cure agent is meant to include curing catalysts and co-catalysts. Any known cure agent may be employed. Suitable cure agents are described, for example, in B. Ellis, "Chemistry and Technology of the Epoxy Resins", Chapman Hall (1993). Examples of cure agents include amines, anhydrides, and carboxylates, such as, for example, metal carboxylates wherein the metal is zinc, magnesium or aluminum, and the carboxylate is a $C_{1-24}$ carboxylate such as acetate, octoate, or stearate. Additional cure agents include imidazoles and arylene polyamines, which are particularly suitable when the thermosetting resin is an epoxy resin. Cure agents are typically present at about 0.1 to about 7 weight percent, preferably from about 0.1 to about 1 weight percent, based on the total weight of resin.

A plasticizer is optionally used to reduce gelation and separation of the composition in solution, as well as to promote less brittle, partially cured substrates. When used in appropriate quantities, these plasticizers reduce the glass transition temperature of the poly(arylene ether) less than 1° C. per part poly(arylene ether) without severely affecting the glass transition temperature of the remaining thermosetting component(s). Suitable plasticizers are known and include, for example, resorcinol diphosphate, bisphenol-A-diphosphate and isopropylated phenol phosphate. The plasticizer may be used at about 0 to about 20 weight percent, preferably about 0.5 to about 10 weight percent, and most preferably about 1 to about 3 weight percent.

The adhesive composition may further optionally comprise various additives, for example, antioxidants, UV absorbers, stabilizers such as light stabilizers and others, lubricants, pigments, dyes, colorants, anti-static agents, flame retardants, impact modifiers, and mixtures thereof. Exemplary antioxidants include organophosphites, for example, tris(nonyl-phenyl)phosphite, tris(2,4-di-t-butylphenyl)phosphite, bis(2,4-di-t-butylphenyl)pentaerythritol diphosphite; 2,4-di-tert-butylphenyl phosphite, or distearyl pentaerythritol diphosphite; alkylated monophenols, polyphenols and alkylated reaction products of polyphenols with dienes, such as, for example, tetrakis[methylene(3,5-di-tert-butyl-4-hydroxyhydrocinnamate)]methane and 3,5-di-tert-butyl-4-hydroxyhydrocinnamate octadecyl; butylated reaction products of para-cresol and dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds, such as, for example, distearylthiopropionate, dilaurylthiopropionate, ditridecylthiodipropionate; and amides of beta-(3,5-di-tert-butyl-4-hydroxyphenyl)propionic acid.

Flame retardant additives include both reactive and non-reactive flame retardant additives such as tetrabromobisphenol A derivatives, including the bis(2-hydroxyethyl)ether of tetrabromobisphenol A, the bis(3-acryloyloxy-2-hydroxypropyl) ether of tetrabromobisphenol A, the bis(3-methacryloyloxy-2-hydroxypropyl) ether of tetrabromobisphenol A, the bis(3-hydroxypropyl) ether of tetrabromobisphenol A, the bis(2,3-dibromopropyl) ether of tetrabromobisphenol A, the diallyl ether of tetrabromobisphenol A, and the bis(vinylbenzyl) ether of tetrabromobisphenol A; pentabromobenzyl acrylate; dibromostyrenes; tribromostyrenes; tetrabromocyclooctanes; dibromoethyldibromocyclohexanes such as 1,2-dibromo-4-(1,2-dibromoethyl)-cyclohexane; ethylene-bis-tetrabromophthalimide; hexabromocyclododecanes; tetrabromophthalic anhydrides; brominated diphenylethers such as decabromodiphenyl ether; poly(2,6-dibromophenylene ether); and tris(2,4,6-tribromophenoxy-1,3,5-triazine; as well as phosphorus-containing additives, for example, the phosphorus-containing additives described above and those described in R. Gachter and H. Muller (eds.), P. P. Klemchuck (assoc. ed.), "Plastic Additives Handbook, $4^{th}$ Edition", Hansen Publishers, (1993). Such additives are typically used in concentrations of about 12 to about 20 weight percent of the brominated additive, or about 15 to about 25 weight percent of the phosphorous-containing additive. Flame retardance may also be imparted to the compositions by the inclusion of brominated thermosetting resins, for example a brominated poly(epoxide), or a poly(arylene ether) having a phosphorous-containing moiety in its backbone.

Where used, the flame retardant is preferably present in an amount effective to achieve a V-1 rating, as determined by Underwriters Laboratories test procedure UL 94, with V-0 being even more preferred. The V-0 rating requires a flame out time (FOT) of not more than 10 seconds in any trial and a cumulative FOT of not more than 50 seconds for five samples.

Other art-known modifiers, fillers, antioxidants, UV absorbers, stabilizers, lubricants, plasticizers, pigments, dyes, colorants, anti-static agents, and flame retardants may also be used in the present invention such as those described in R. Gachter and H. Muller (eds.), P. P. Klemchuck (assoc. ed.), "Plastic Additives Handbook, $4^{th}$ Edition", Hansen Publishers, (1993).

Fillers may also be added optionally to the adhesive compositions for the purpose of adjusting dielectric constant, loss factor, and expansion characteristics to match the adherend. Suitable fillers include but are not limited to silicates, titanium dioxide, fibers, glass fibers (including continuous and chopped fibers), carbon black, graphite, calcium carbonate, talc, and mica. Suitable fillers are determined by the desired end application.

The preparation of the adhesive composition is normally achieved by merely blending the components under conditions suitable for the formation of an intimate blend. A non-reactive solvent may also be used, for example a hydrocarbon such as toluene or xylene. During mixing, the blend is preferably sufficiently heated such that the components are in solution, thereby enabling intimate mixing. Such conditions include mixing components in a vessel capable of heating and shearing action to thoroughly dissolve and blend all components.

Suitable adherends include metals, particularly conductive metals such as copper or aluminum, and resinous thermoplastic substrate materials, particularly those known for use in printed circuit boards, such as polyimide, polyetherimide, and polyesteretherimide polymers, and blends of poly(arylene ether) with polyimide or polyester polymers. A number of poly(arylene ether) compositions having favorable dielectric properties and utility in circuit board manufacture are known.

In use, the adhesive compositions are blended and then applied to the adherends by known methods, including spreading or dipping as well as various known roll transfer manufacturing methods. Solvent, if present, is removed, and the adhesive composition is partially cured. Full curing generally requires heating at a temperature greater than about 180° C., for at least about 2.5 hours. Less than full cure may be used depending on the properties of the final product desired.

In a typical process for preparing rigid metal clad materials using the poly(arylene ether) compositions, individual lamina (commonly called prepregs) are formed from a resinous binder composition. Continuous webs of reinforcement can be pre-impregnated with the solution and then dried in a vertical or horizontal treating tower or oven. Normally, the resin is partially cured or B-staged after exiting the treater tower or oven. A metal, typically copper, foil, coated with the adhesive composition, is placed on one side of the prepreg and subjected to heating under pressure to effect a bond between the metal foil and the substrate. Multiple prepregs can be used in forming a single composite board. Additionally, multi-layer printed wiring boards will have a number of interposed laminae and copper sheets. The curing cycle in the press will depend upon the nature and thickness of the laminate, the time and temperature of the cycle being those required to cure the substrate and the bonding prepreg layer. Sufficient pressure is required to effect adequate flow of the substrate resins in order to wet out woven substrates and bond adequately. The pressure must be sufficient to prevent blistering which is due to the release of gases either from retained volatiles in the substrate or adhesive layers, or resulting from by products of the curing process.

In a typical process for preparing flexible metal clad boards using the present adhesive composition, individual lamina are formed from a film, for example a polyimide film such as the polyimide film available from DuPont under the trademark KAPTON®. The metalized thermoplastic film is coated with the adhesive composition on the non-metal side, and the adhesive side of the composite is placed on a pre-made circuit inner-layer, then subjected to heating under pressure to effect a bond between the thermoplastic substrate and inner layer of circuitry. The cured adhesive layers are typically between about 0.5 and about 2.5 mils thick. Multiple metallized thermoplastic with adhesive can be used in forming a single composite board. Additionally, multi-layer printed wiring boards will have a number of interposed laminae and copper sheets. The curing cycle in the press will again depend upon the nature and thickness of the laminate, the time and temperature of the cycle being those required to cure the substrate, and the bonding adhesive layer. Sufficient pressure is required to effect adequate flow of the adhesive and/or substrate resins in order to wet out and bond adequately. The pressure must be sufficient to prevent blistering which is due to the release of gases resulting either from retained volatiles in the substrate or adhesive layers, or resulting from by products of the curing process.

For example, the adhesive layer may be provided having thicknesses typically of about 0.0005 inch to about 0.003 inch and the adhesives may be cured at temperatures typically in the range of about 175° C. to about 205° C. The particular combination of resin thicknesses, curing times and curing temperatures may be selected according to a variety of factors including but not limited to the particular type of resin used and the particular application. Those of ordinary skill in the art will know how to select the particular curing times and temperatures required to provide the proper dielectric for the final circuit board.

The resultant circuit board is then capable of further processing such as generation of extremely thin circuit traces due to thin copper and smooth surface of the thermoplastic film. These circuit board manufacturing techniques are known in the art. The thermoplastic/adhesive composition is fully laser ablateable for drilling as it is fully organic in nature and is useful in, for instance, microvia technologies.

The invention is further illustrated by the following non-limiting examples.

EXAMPLES

The components used in the following examples are shown in Table 1 below. The poly(arylene ether) designated "PPO (0.30 I.V.)" is not commercially available and was prepared and isolated according to known techniques for oxidative coupling of 2,6-xylenol. Similar synthetic procedures are described in, for example, U.S. Pat. No. 3,306,875 to Hay.

TABLE 1

| Trade Name | Source | Component |
|---|---|---|
| PPO ® (0.40 I.V) | General Electric | Poly(arylene ether), IV = 0.40, number average molecular weight = 14,200 |
| PPO ® (0.30 I.V.) | General Electric (not commercial) | Poly(arylene ether), IV = 0.30, number average molecular weight 11,000 |

TABLE 1-continued

| Trade Name | Source | Component |
|---|---|---|
| Bisphenol A-157 | Shell Chemical | Bisphenol A |
| 75% Dibenzoyl Peroxide, water wet | Lucidol | Benzoyl peroxide |
| EPON ® 1163T60 | Shell Chemical | Brominated epoxy resin |
| Upstage Resin | General Electric | EPON ® 828/TBBPA copolymer |
| ARALDITE ® EPN1138 | Ciba Geigy | Epoxy Novolac |
| BUTVAR ® B76 | Solutia | Polyvinyl butyral |
| KRATON ® D1101 | Shell Chemical | SBS block co-polymer |
| THERM-CHEK ® 705 | Ferro Corp. | Zinc Octoate |
| ETHACURE ® 100 | Albemarle | Aryl amine |
| IMICURE ® EMI-24 Curing Agent | Air Products | Imidazole accelerator |
| — | General Electric | resorcinol diphosphate (plasticizer) |
| KAPTON ®-0.002" | DuPont | Polyimide film |
| GOULDFLEX ®-0.002" PI | Gould Electronics | Metalized polyimide film |

Poly(arylene ether)-epoxide adhesive compositions were prepared having the compositions as outlined in the Table 2. First, the poly(arylene ether) was dissolved in toluene and tetrabromobisphenol-A diglycidyl ether to produce a solution containing approximately 40% solids. The solution was heated to 90° C. to 100° C., followed by addition of bisphenol A and benzoyl peroxide (or, with benzoyl peroxide alone) and maintained at 90° C. to 100° C. for approximately 90 minutes. The solution was allowed to cool and the styrene-butadiene-styrene (SBS) block co-polymer or polyvinyl butyral compatibilizer was added. The other epoxy resins (bisphenol-A diglycidyl ether/tetrabromo bisphenol-A condensation product and epoxidized novolac) were added and the amount of toluene adjusted to generate a resin solution having 50 weight percent solids. A cure agent package consisting of zinc octoate, 2-methyl-4-ethylimidazole, and diaminodiethylbenzene was then added to complete the formulation.

A polyimide film was coated with each of the resin solutions described. Drawdown bars (#12–#30) were used to apply differing thicknesses of solution to the substrate. Each coated material was heated to remove solvent and partially cure the resin to produce a B-staged coated thermoplastic material. The drum side (shiny, smooth) side of one ounce copper foil (supplied by Gould Electronics) was laminated to the adhesive coated thermoplastic. Typical lamination cycles were 200 pounds per square inch (psi) and 190° C. for 3 hours.

On each cured composite material physical properties were determined, and results are listed in Table 2. The amount of each component shown is weight % of the solid composition. All measurements were at room temperature unless otherwise noted. Z-axis expansion was measured according to IPC-TM-650 2.4.24. Peel A and Peel after solder were measured according to IPC-TM-650 2.4.8. Solder blister times were measured according to IPC-TM-650 2.4.13.1. The three hour pressure cooker test was conducted according to IPC-TM-650 2.6.16.

Solder immersion samples were solid resin bars made for this purpose.

TABLE 2

| | 1 | 2 | 3 | 4 | 5 | 6 |
|---|---|---|---|---|---|---|
| Component | | | | | | |
| PPO ® (I.V. = 0.40) | 31.89 | 30.46 | 30.37 | 30.18 | — | 29.15 |
| PPO ® (I.V. = 0.30) | — | — | — | — | 30.65 | — |
| Digylcidyl ether of tetrabromobisphenol A | 32.56 | 31.1 | 31.0 | 30.82 | 31.29 | 29.76 |
| Bisphenol A | 0.32 | 0.30 | .30 | 0.30 | — | 0.29 |
| Benzoyl peroxide | 0.32 | 0.32 | .32 | 0.31 | — | 0.30 |
| Epoxy novolac | 14.68 | 14.0 | 13.98 | 13.90 | 14.11 | 13.42 |
| Epon828/TBBPA copolymer | 14.68 | 14.0 | 13.98 | 13.90 | 14.11 | 13.42 |
| Polyvinyl Butyral | — | 4.48 | 4.47 | 4.44 | 4.51 | — |
| SBS block co-polymer | — | — | — | — | — | 8.58 |
| Zinc Octoate | 4.25 | 4.06 | 4.04 | 4.02 | 4.08 | 3.88 |
| Diethylenediamine | 0.93 | 0.89 | 0.89 | 0.88 | 0.90 | 0.85 |
| 2-methyl-4-ethyl-imidazole | 0.36 | 0.35 | 0.35 | 0.35 | 0.35 | 0.33 |
| Plasticizer | — | — | 0.30 | 0.91 | — | — |
| Properties | | | | | | |
| Tg (° C.) | 149/197 | 130/185 | 133/192 | 126/165 | 137/196 | 141/177 |
| Z-axis expansion (30–260 C., %, on neat resin bar) | — | 4.18 | 4.37 | 4.48 | — | — |

TABLE 2-continued

|  | 1 | 2 | 3 | 4 | 5 | 6 |
|---|---|---|---|---|---|---|
| Film Thickness (in) | 0.002 | 0.002 | 0.002 | 0.002 | 0.002 | 0.002 |
| Peel A (lbs/in) | 5.9 | 6.6 | 7.0 | 7.6 | 6.6 | 8.0 |
| Peel after solder (lbs/in) | 4.6 | 6.1 | 5.8 | 8.1 | 5.8 | 8.3 |
| 2 min. immersion in solder at 288° C. | No effect | No effect | No effect | No effect | No effect | No effect |
| Solder blister times (sec) | — | — | 80–120 | 126–155 | 100–205 | 181–272 |
| 3 hour pressure cooker | Pass | Pass | Pass | Pass | — | — |

It should be noted that peel failure mechanism for all samples was found to be a cohesive failure between copper and adhesive rather than adhesive and thermoplastic. High bond strengths between adhesive and thermoplastic are desirable for reliability.

While preferred embodiments have been shown and described, various modifications and substitutions may be made thereto without departing from the spirit and scope of the invention. Accordingly, it is to be understood that the present invention has been described by way of illustrations and not limitation.

All cited patents and other references are incorporated herein by reference.

What is claimed is:

1. A laminate, comprising:
  a thermoplastic substrate;
  a conductive metal foil at least partially disposed on at least one side of the substrate; and
  an adhesive disposed between the substrate and the metal foil, wherein the adhesive is formed from a composition comprising, based on 100 weight percent of the resin portion of the composition
  about 5 to about 50 weight percent of a poly(arylene ether) resin having a number average molecular weight of about 8,000 to about 13,000;
  about 50 to about 90 weight percent of a thermosetting resin selected from the group consisting of cyanate esters, polyesters, epoxy, benzoxazines, benzocyclobutene resins, and mixtures thereof;
  about 0.5 to about 15 weight percent of a toughening agent selected from the group consisting of poly(vinyl butyral-co-vinyl acetate) resins and partially hydrolyzed poly(vinyl butyral-co-vinyl acetate) resins; and
  about 0.1 to about 7 weight percent of a cure agent.

2. The laminate of claim 1, wherein the poly(arylene ether) resin comprises a plurality of structural units of the formula (I);

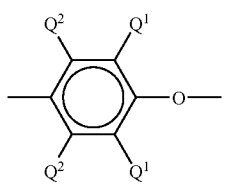

(I)

wherein for each structural unit, each $Q^1$ is independently halogen, primary or secondary lower alkyl having up to about 7 carbon atoms, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl having up to 7 carbon atoms, phenyl, haloalkyl, hydrocarbonoxy or halohydrocarbonoxy wherein at least two carbon atoms separate the halogen and oxygen atoms.

3. The laminate of claim 1, wherein the poly(arylene ether) resin has a number average molecular weight of about 9,000 to about 12,000.

4. The adhesive of claim 1 wherein the poly(arylene ether) is a homopolymer comprising 2,6-dimethylphenylene ether units, or a random copolymer comprising 2,6-dimethylphenylene ether units in combination with 2,3,6-trimethyl-1,4-phenylene ether units.

5. The laminate of claim 1, wherein the thermosetting resin comprises an epoxy.

6. The laminate of claim 5, wherein the epoxy is a condensation product of a bisphenol polyglycidyl ether and a bromine-substituted bisphenol.

7. The laminate of claim 5, wherein the epoxy is the reaction product of tetrabromobisphenol A and the diglycidyl ether of bisphenol A or bisphenol F, the reaction product having an average of at most one aliphatic hydroxy group per molecule, and the reaction product comprising about 10 to about 30 weight percent bromine as aryl substituents.

8. The laminate of claim 5, wherein the cure agent comprises an imidazole or an arylene polyamine.

9. The laminate of claim 1, wherein the thermosetting resin comprises a cyanate ester.

10. The laminate of claim 1, wherein the thermosetting resin comprises a polyester.

11. The laminate of claim 1, wherein the thermosetting resin comprises a benzoxazine or benzocyclobutene resin.

12. The laminate of claim 1, wherein the thermosetting resin comprises an epoxy and a cyanate ester.

13. The laminate of claim 1, wherein the toughening agent is present at 1 to 15 weight percent of the total composition solids.

14. A method for forming a laminate comprising:
  coating a surface of a thermoplastic or metalized thermoplastic or conductive metal foil with an adhesive comprising, based on 100 weight percent of the resin portion of the composition:
  about 5 to about 50 weight percent of a poly(arylene ether) resin having a number average molecular weight of about 8,000 to about 13,000;
  about 50 to about 90 weight percent of a thermosetting resin selected from the group consisting of cyanate esters, polyesters, epoxy, benzoxazines, benzocyclobutene resins, and mixtures thereof;
  about 0.5 to about 15 weight percent of a toughening agent selected from the group consisting of poly (vinyl butyral-co-vinyl acetate) resins and partially hydrolyzed poly(vinyl butyral-co-vinyl acetate) resins; and about 0.1 to about 7 weight percent of a cure agent; and applying the adhesive against a first surface of a thermoplastic substrate.

15. The method of claim 14, further comprising partially curing the adhesive prior to applying the adhesive against the substrate.

16. The method of claim 14, wherein the thermosetting resin comprises an epoxy.

17. The method of claim 16, wherein the cure agent comprises an imidazole or an arylene polyamine.

18. A method for forming a laminate comprising:

coating a surface of a thermoplastic or metalized thermoplastic or conductive metal foil with an adhesive comprising, based on 100 weight percent of the resin portion of the composition about 5 to about 50 weight percent of a poly(arylene ether) resin having a number average molecular weight of about 8,000 to about 13,000;

about 50 to about 90 weight percent of a thermosetting resin selected from the group consisting of cyanate esters, polyesters, epoxy, benzoxazines, benzocyclobutene resins, and mixtures thereof; wherein the thermosetting resin comprises an epoxy; and about 0.5 to about 15 weight percent of a toughening agent selected from the group consisting of poly (vinyl butyral-co-vinyl acetate) resins; and partially hydrolyzed poly(vinyl butyral-co-vinyl acetate) resins; and about 0.1 to about 7 weight percent of a cure agent; and applying the adhesive against a first surface of a thermoplastic substrate.

19. A laminate, comprising:

a thermoplastic substrate;

a conductive metal foil at least partially disposed on at least one side of the substrate; and an adhesive disposed between the substrate and the metal foil, wherein the adhesive is formed from a composition comprising, based on 100 weight percent of the resin portion of the composition about 5 to about 50 weight percent of a poly(arylene ether) resin having a number average molecular weight of about 8,000 to about 13,000;

about 50 to about 90 weight percent of a thermosetting resin selected from the group consisting of cyanate esters, polyesters, epoxy, benzoxazines, benzocyclobutene resins, and mixtures thereof;

about 0.5 to about 15 weight percent of a toughening agent comprising poly(vinyl butyral-co-poly-vinyl alcohol-co-polyvinyl acetate); and about 0.1 to about 7 weight percent of a cure agent.

20. A method for forming a laminate comprising:

coating a surface of a thermoplastic or metalized thermoplastic or conductive metal foil with an adhesive comprising, based on 100 weight percent of the resin portion of the composition:

about 5 to about 50 weight percent of a poly(arylene ether) resin having a number average molecular weight of about 8,000 to about 13,000;

about 50 to about 90 weight percent of a thermosetting resin selected from cyanate esters, polyesters, epoxy, benzoxazines, benzocyclobutene resins, and mixtures thereof;

about 0.5 to about 15 weight percent of a toughening agent comprising poly(vinyl butyral-co-polyvinyl alcohol-co-polyvinyl acetate); and about 0.1 to about 7 weight percent of a cure agent; and applying the adhesive against a first surface of a thermoplastic substrate.

* * * * *